US009087536B2

(12) United States Patent
Yamada

(10) Patent No.: US 9,087,536 B2
(45) Date of Patent: Jul. 21, 2015

(54) THERMALLY-ASSISTED MAGNETIC RECORDING HEAD AND DISK DRIVE WITH THE SAME

(71) Applicant: Kabushiki Kaisha Toshiba, Minato-ku, Tokyo (JP)

(72) Inventor: Yuichi Yamada, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/172,111

(22) Filed: Feb. 4, 2014

(65) Prior Publication Data

US 2015/0117167 A1 Apr. 30, 2015

(30) Foreign Application Priority Data

Oct. 24, 2013 (JP) ................................ 2013-221316

(51) Int. Cl.
*G11B 5/60* (2006.01)
*G11B 5/48* (2006.01)
*G11B 5/31* (2006.01)

(52) U.S. Cl.
CPC ............ *G11B 5/4866* (2013.01); *G11B 5/6088* (2013.01); *G11B 5/3116* (2013.01)

(58) Field of Classification Search
CPC ..................... G11B 2005/0021; G11B 5/4866; G11B 5/6088; G11B 5/3116
USPC ............... 360/125.31, 125.74, 59; 369/13.33, 369/112.27
See application file for complete search history.

(56) References Cited

U.S. PATENT DOCUMENTS

| | | | |
|---|---|---|---|
| 7,206,166 B2 * | 4/2007 | Notsuke et al. | 360/122 |
| 7,944,780 B2 | 5/2011 | Sekine et al. | |
| 7,990,654 B2 * | 8/2011 | Yazawa et al. | 360/125.09 |
| 8,134,802 B2 | 3/2012 | Bai et al. | |
| 8,243,388 B2 * | 8/2012 | Shimazawa et al. | 360/125.74 |
| 8,254,214 B2 * | 8/2012 | Shimazawa et al. | 369/13.33 |
| 8,351,305 B2 | 1/2013 | Zhou et al. | |
| 8,353,098 B2 * | 1/2013 | Mino et al. | 29/603.14 |
| 8,427,927 B1 * | 4/2013 | Chou et al. | 369/112.27 |
| 2006/0262453 A1 * | 11/2006 | Mochizuki et al. | 360/125 |
| 2007/0177302 A1 | 8/2007 | Shimazawa et al. | |
| 2007/0206323 A1 * | 9/2007 | Im et al. | 360/126 |
| 2010/0128382 A1 | 5/2010 | Maeda et al. | |
| 2011/0085266 A1 * | 4/2011 | Kanai et al. | 360/125.03 |
| 2014/0177091 A1 * | 6/2014 | Urakami et al. | 360/75 |

FOREIGN PATENT DOCUMENTS

| | | |
|---|---|---|
| JP | 2007-207349 | 8/2007 |
| JP | 2010-123232 | 6/2010 |

* cited by examiner

*Primary Examiner* — Brian Miller
(74) *Attorney, Agent, or Firm* — Knobbe, Martens, Olson & Bear, LLP

(57) ABSTRACT

According to one embodiment, a magnetic recording head includes a medium-facing surface, a near-field transducer partially exposed in the medium-facing surface, and a magnetic pole including a distal end surface and a pole end surface facing the near-field transducer. The pole end surface in the medium-facing surface is asymmetric with respect to a central axis passing through a center of the near-field transducer and extending in a longitudinal direction of the medium-facing surface.

16 Claims, 10 Drawing Sheets

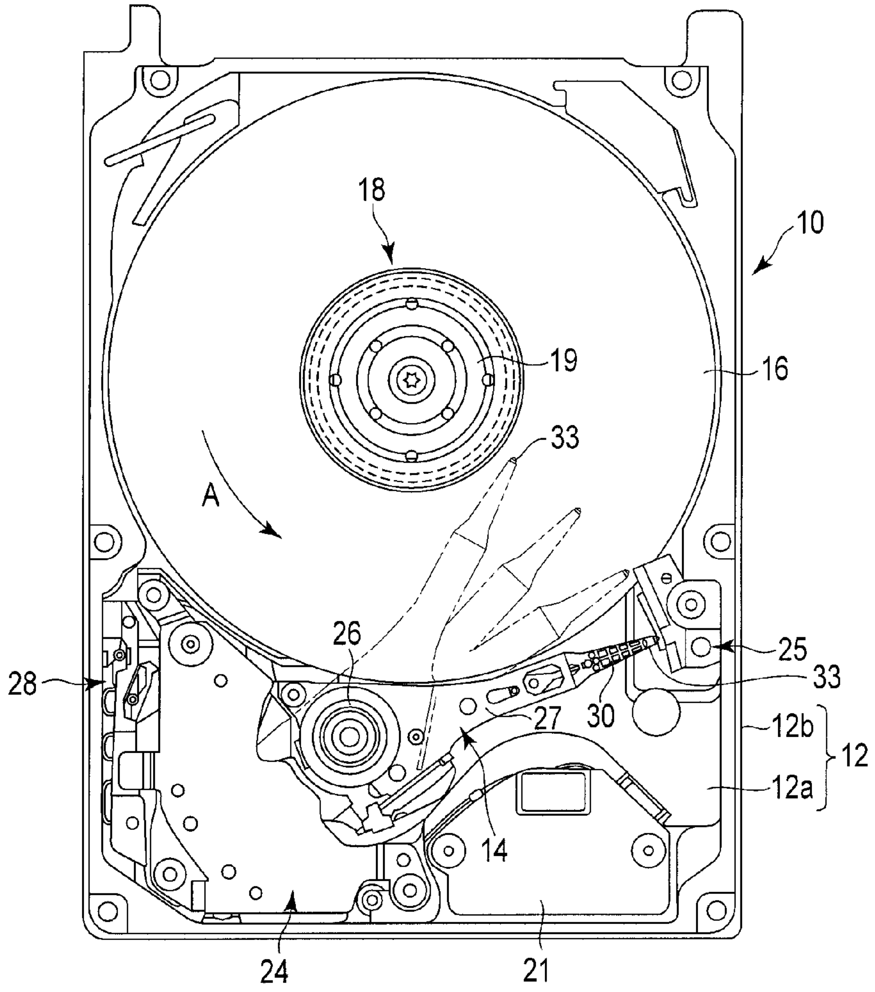
F I G. 1
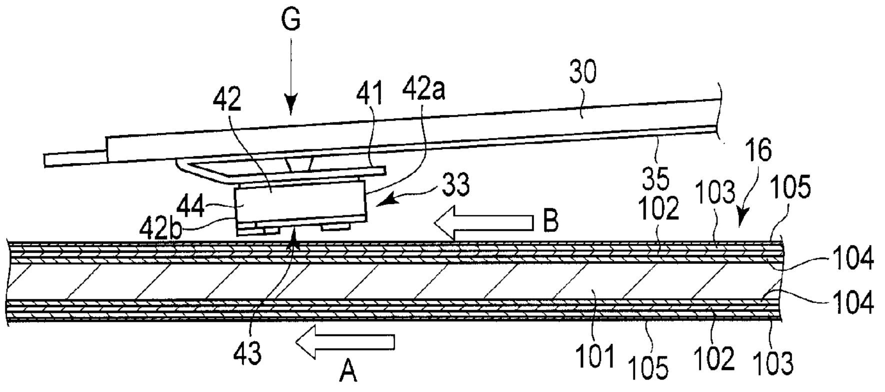
F I G. 2

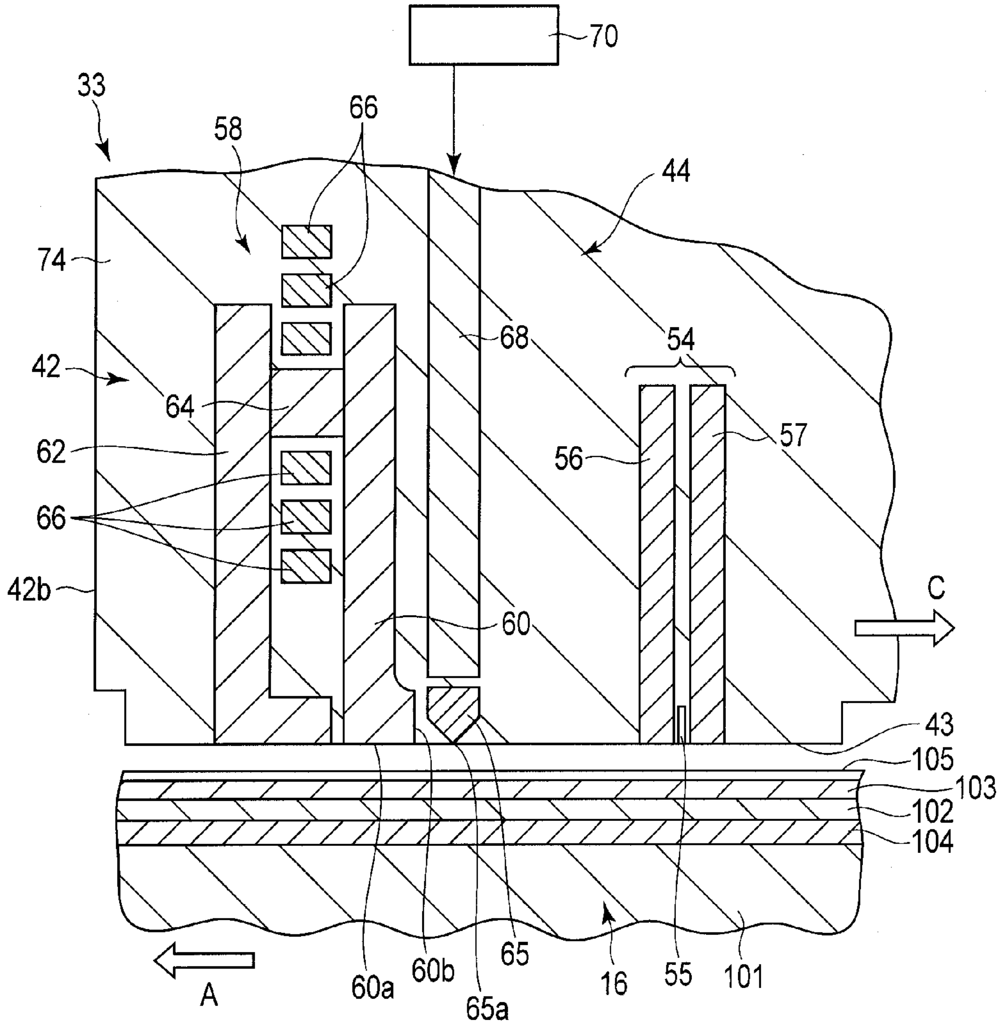
F I G. 3

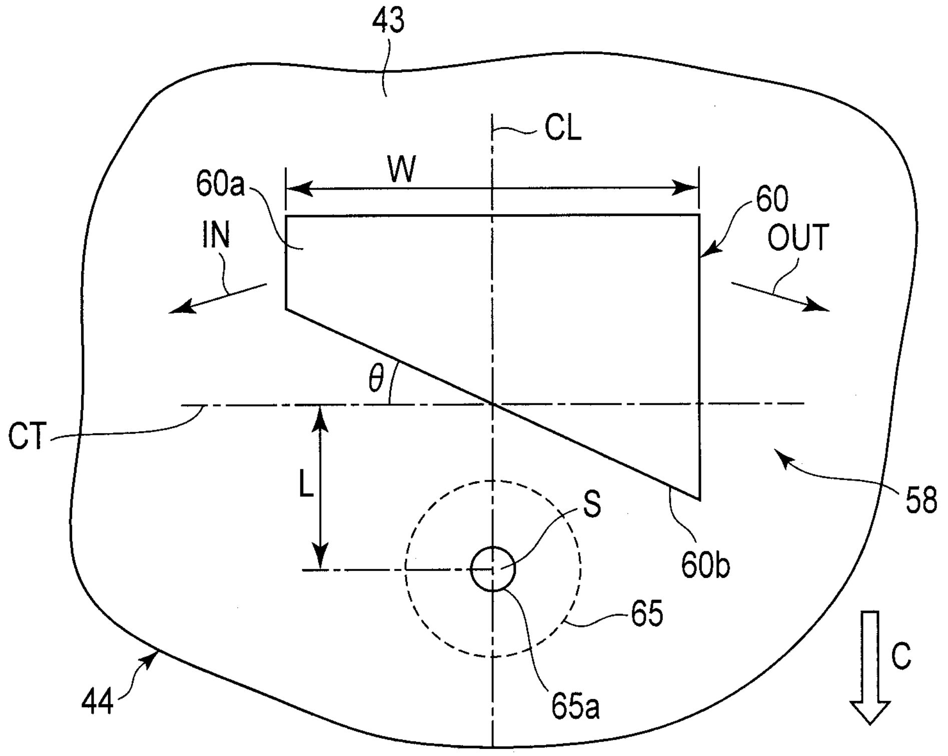
F I G. 4

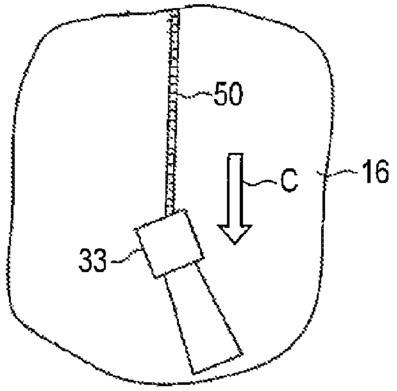
F I G. 8
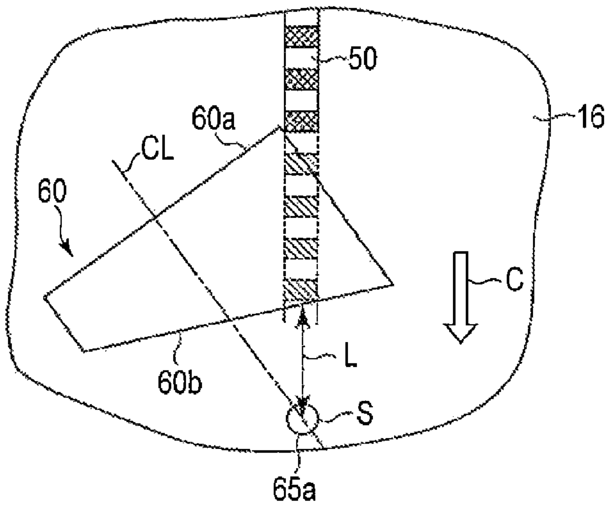
F I G. 9
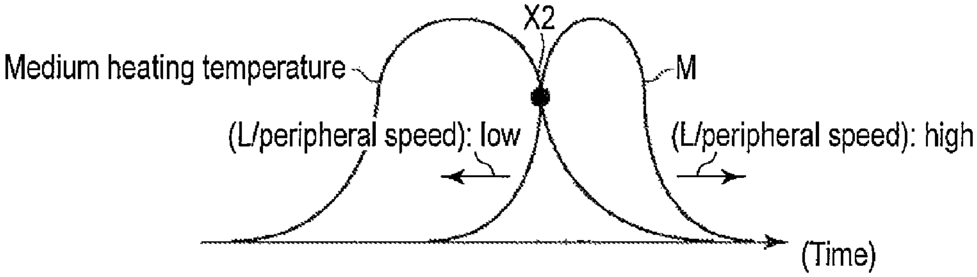
F I G. 10

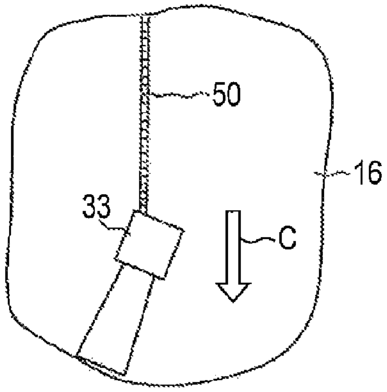
F I G. 11
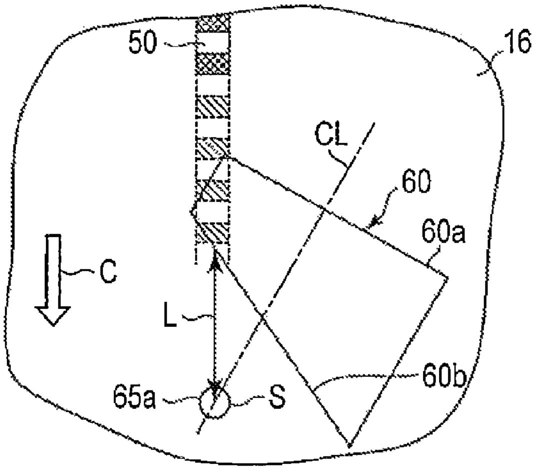
F I G. 12
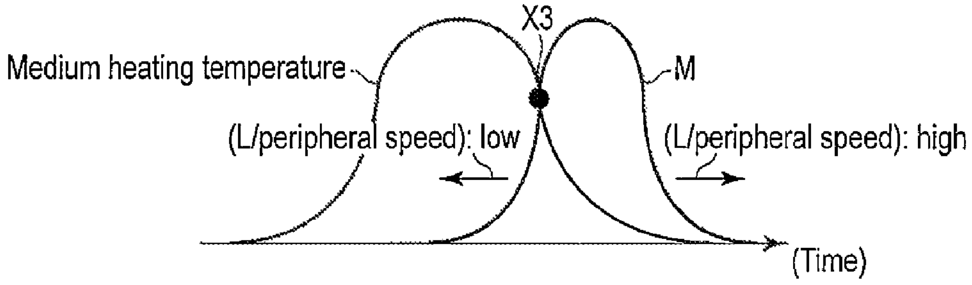
F I G. 13

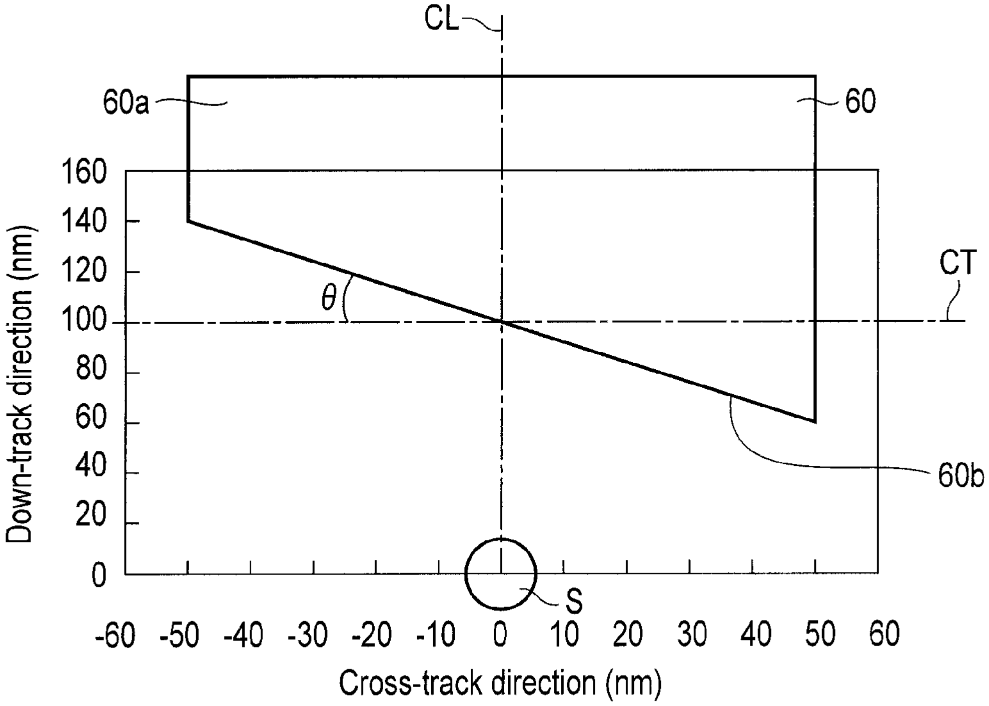
F I G. 14
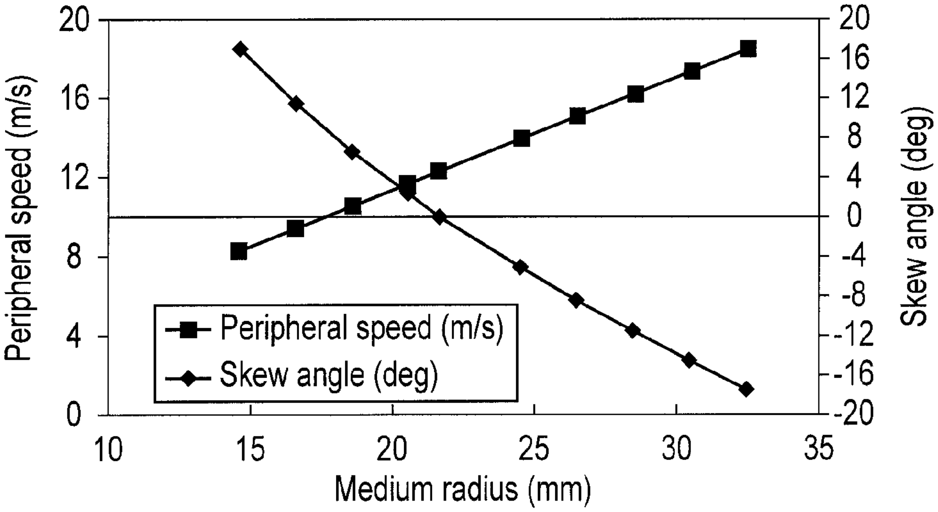
F I G. 15

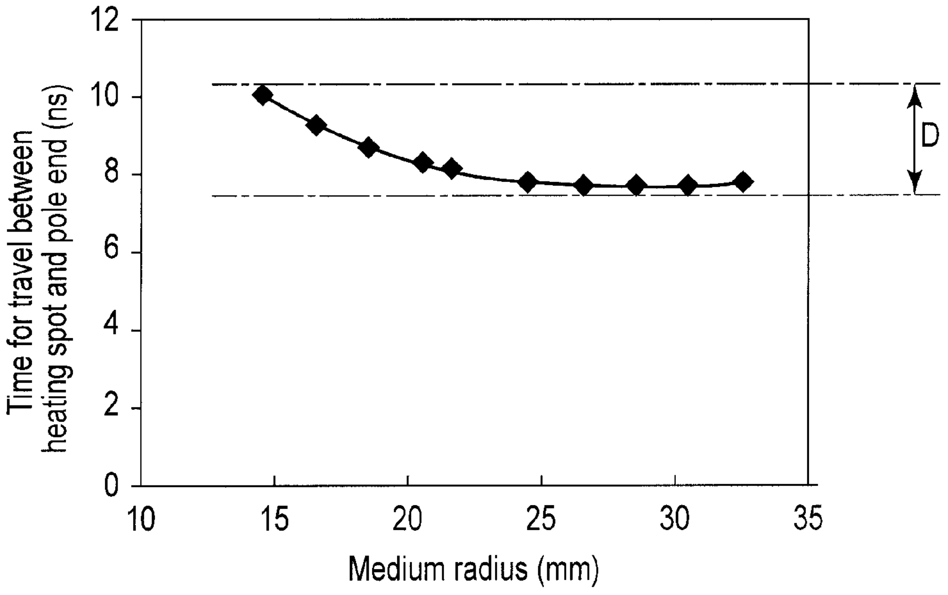
F I G. 16
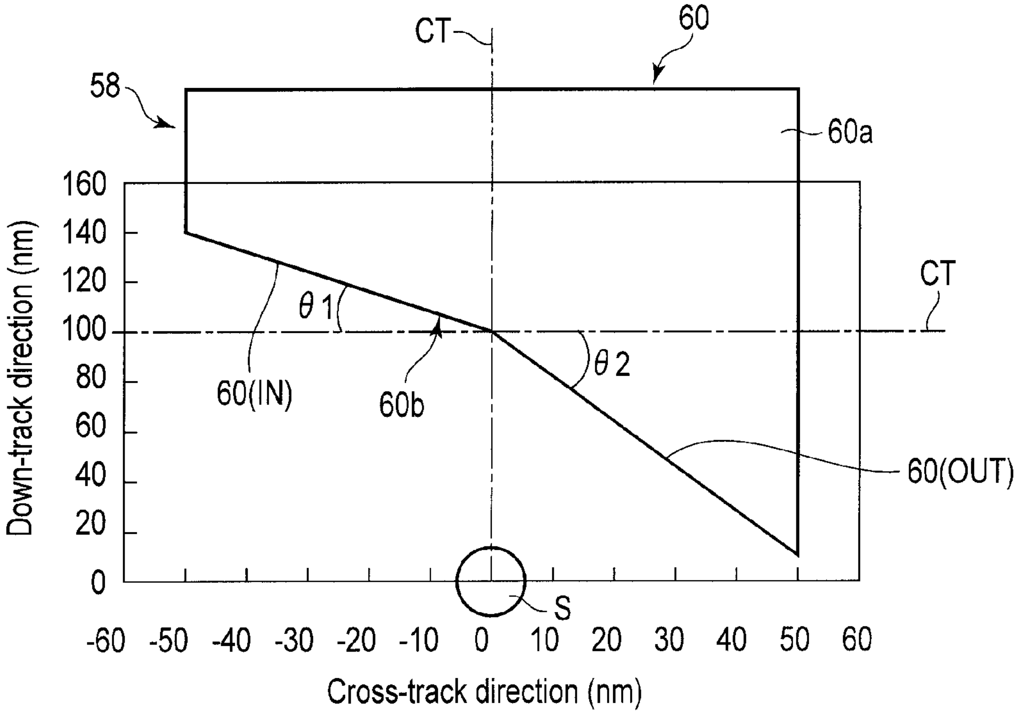
F I G. 17

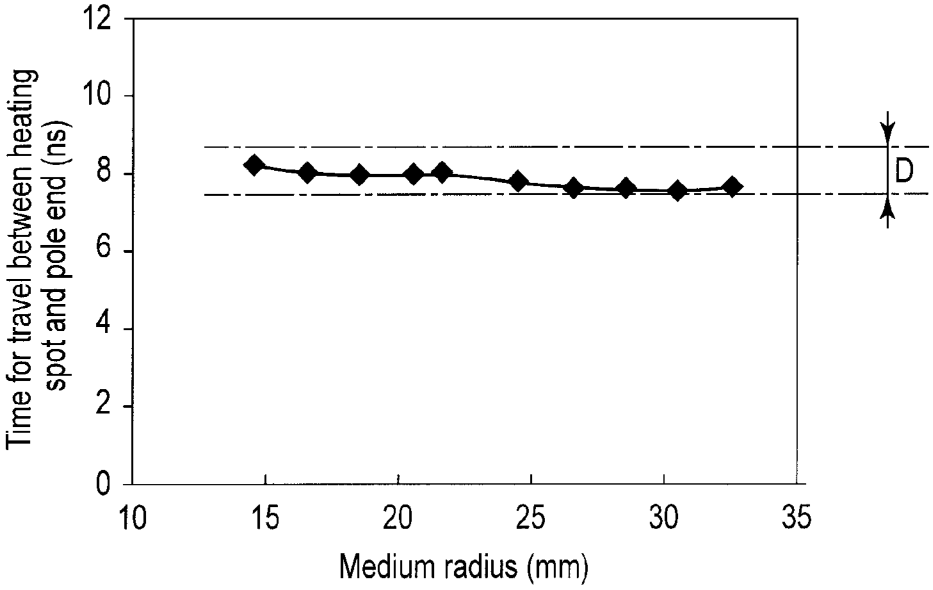
F I G. 18
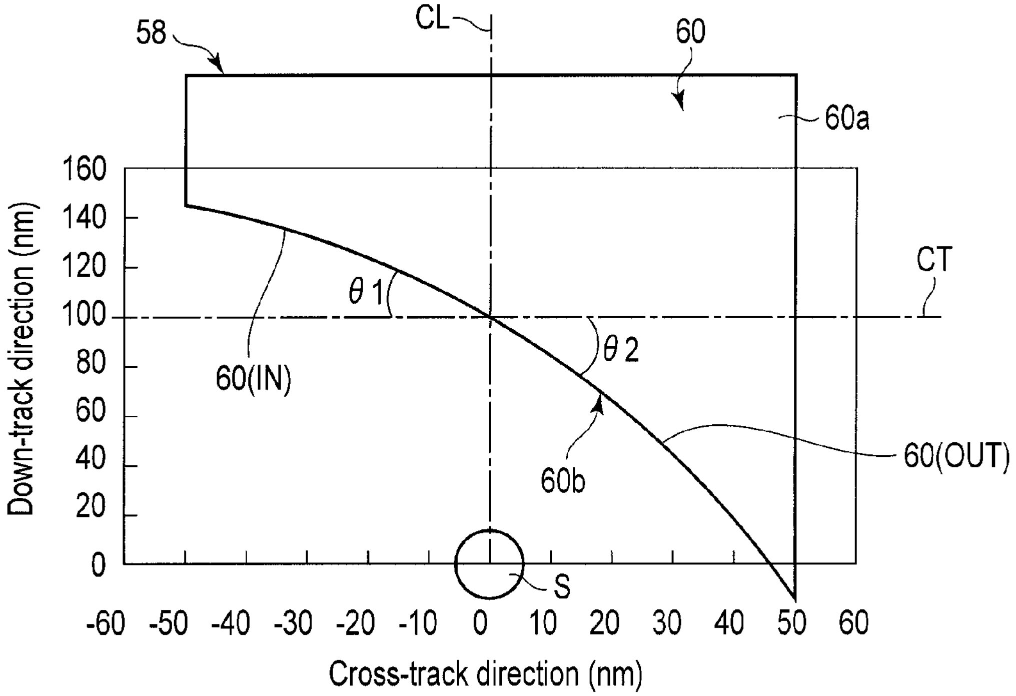
F I G. 19

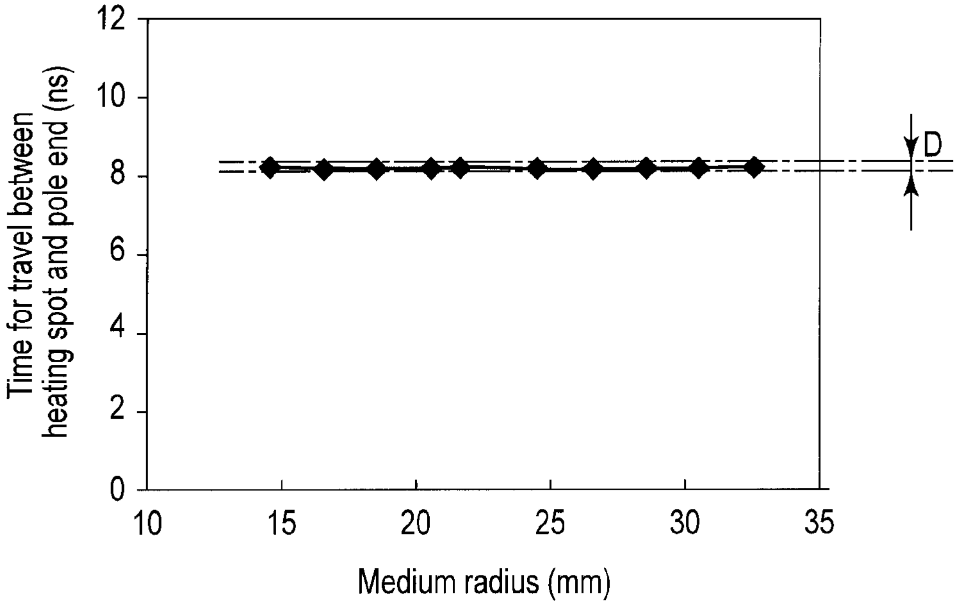
F I G. 20
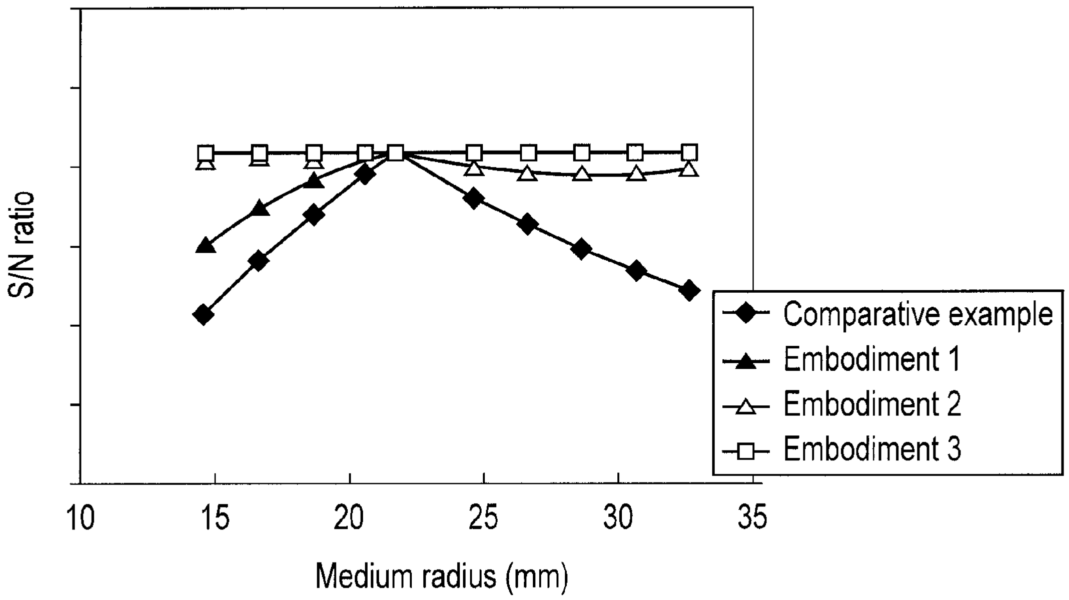
F I G. 21

THERMALLY-ASSISTED MAGNETIC RECORDING HEAD AND DISK DRIVE WITH THE SAME

CROSS-REFERENCE TO RELATED APPLICATIONS

This application is based upon and claims the benefit of priority from Japanese Patent Application No. 2013-221316, filed Oct. 24, 2013, the entire contents of which are incorporated herein by reference.

FIELD

Embodiments described herein relate generally to a magnetic recording head based on a thermally-assisted recording system and a disk drive provided with the same.

BACKGROUND

A disk drive, such as a magnetic disk drive, comprises a magnetic disk, spindle motor, and magnetic head. The magnetic disk for use as a recording medium is arranged in a case. The spindle motor supports and rotates the magnetic disk. The magnetic head reads data from and writes data to the magnetic disk. The magnetic head is supported by a pivotable head actuator and configured to be moved radially relative to the magnetic disk and positioned in place.

Magnetic heads for perpendicular magnetic recording and thermally-assisted magnetic recording systems have recently been proposed in order to increase the recording density and capacity of a magnetic disk drive or reduce its size. One such magnetic head comprises a near-field transducer, which emits near-field light toward a recording layer of the recording medium and a waveguide for propagating light for the emission of the near-field light. According to this magnetic head, the medium recording layer having a perpendicular magnetic anisotropy is locally heated by the near-field light emitted from the distal end of the near-field transducer during writing data. In this way, the coercive force of the recording layer portion is fully reduced, so that a high recording density can be achieved.

The distance (transducer-pole distance) between a heating spot center of the near-field transducer and a main pole end along the track of the magnetic disk changes according to the rotational position of the magnetic head. Thus, the skew angle changes according to the rotational position of the magnetic head, so that the transducer-pole distance varies depending on the position of the magnetic disk, whether inner peripheral, intermediate peripheral, or outer peripheral, where the magnetic head is located. The transducer-pole distances in the inner and outer peripheral positions are longer than that in the intermediate peripheral position.

Further, the moving speed of the magnetic recording head relative to the magnetic disk, that is, the peripheral speed of the disk, varies according to the radial position of the disk. The peripheral speeds in the inner and outer peripheral positions are lower and higher, respectively, than that in the intermediate peripheral position.

In thermally-assisted recording, there exists a time T ((transducer-pole distance)/peripheral speed) of medium travel between the heating spot center and a pole end surface that ensures an optimal signal-to-noise (S/N) ratio. As described before, however, the transducer-pole distance and peripheral speed vary depending on the position of the magnetic disk, whether inner peripheral, intermediate peripheral, or outer peripheral. Therefore, it is difficult to obtain an optimal medium travel time or optimal S/N ratio for every radial position. In the inner peripheral position, for example, the transducer-pole distance and peripheral speed are long and low, respectively, so that the medium travel time T ((transducer-pole distance)/peripheral speed) is longer than in the intermediate peripheral position, and the optimal S/N ratio cannot be easily obtained.

BRIEF DESCRIPTION OF THE DRAWING

FIG. 1 is a plan view showing a hard disk drive (HDD) according to a first embodiment;

FIG. 2 is a side view showing a magnetic head and suspension of the HDD;

FIG. 3 is an enlarged sectional view showing a head section of the magnetic head;

FIG. 4 is a schematic plan view of a distal end portion of a recording head of the magnetic head in an intermediate peripheral position of a medium taken through the top of the magnetic head;

FIG. 8 is a plan view showing positional relationship between the magnetic head and recording track in the case where the magnetic recording is performed in the inner peripheral position of the magnetic disk;

FIG. 9 is a plan view showing positional relationships between a heating spot center, main pole, and a recording track in the state of FIG. 8;

FIG. 10 is a diagram showing influences of heating and the magnetic field from the magnetic head on the magnetic disk at one spot on the disk;

FIG. 11 is a plan view showing positional relationship between the magnetic head and recording track in the case where the magnetic recording is performed in the outer peripheral position of the magnetic disk;

FIG. 12 is a plan view showing positional relationships between a heating spot center, main pole, and a recording track in the state of FIG. 11;

FIG. 13 is a diagram showing influences of heating and the magnetic field from the magnetic head on the magnetic disk at one spot on the disk;

FIG. 14 is a diagram showing positional relationships between the main pole of the recording head according to the first embodiment and the heating spot center in the down-track and cross-track directions;

FIG. 15 is a diagram showing peripheral speed and skew angle of the magnetic head according to the first embodiment in each radial position of the magnetic disk;

FIG. 16 is a diagram showing time required for travel between the heating spot center and pole end surface in each radial position of the magnetic disk;

FIG. 17 is a diagram showing positional relationships between a main pole of a recording head according to a second embodiment and a heating spot center in the down-track and cross-track directions;

FIG. 18 is a diagram showing time required for travel between the heating spot center and a pole end surface in each radial position of a magnetic disk in the second embodiment;

FIG. 19 is a diagram showing positional relationships between a main pole of a recording head according to a third embodiment and a heating spot center in the down-track and cross-track directions;

FIG. 20 is a diagram showing time required for travel between the heating spot center and a pole end surface in each radial position of a magnetic disk in the third embodiment; and FIG. 21 is a diagram comparatively showing signal S/N ratios for each radial position of each magnetic disk for a recording head with a comparative example and the recording heads according to the first to third embodiments.

DETAILED DESCRIPTION

Figure 5:
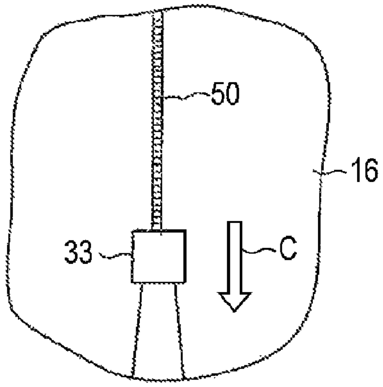
FIG. 5 is a plan view showing positional relationship between the magnetic head and a recording track in the case where magnetic recording is performed in the intermediate peripheral position of the magnetic disk.

Various embodiments will be described hereinafter with reference to the accompanying drawings. In general, according to one embodiment, a magnetic recording head comprises a medium-facing surface configured to face a recording layer of a disk recording medium; a near-field transducer partially exposed in the medium-facing surface and configured to emit a near-field light which heats the recording medium; and a magnetic pole comprising a distal end surface exposed in the medium-facing surface and a pole end surface facing the near-field transducer and configured to apply a recording magnetic field to the recording layer of the recording medium. The pole end surface in the medium-facing surface is asymmetric with respect to a central axis passing through a center of the near-field transducer and extending in a longitudinal direction of the medium-facing surface.

First Embodiment

FIG. 1 shows the internal structure of an HDD according to a first embodiment with its top cover removed, and FIG. 2 shows a flying magnetic head. As shown in FIG. 1, the HDD comprises a housing 10. The housing 10 comprises a base 12 in the form of an open-topped rectangular box and a top cover (not shown) in the form of a rectangular plate. The top cover is attached to the base 12 by screws such that it closes the top opening of the base. The base 12 comprises a bottom wall 12*a* and a side wall 12*b* set up along the peripheral edge of the bottom wall 12*a*.

A magnetic disk 16, for use as a recording medium, and a drive unit are provided on the bottom wall 12*a* of the base 12. The drive unit comprises a spindle motor 18, a plurality (for example, two) of magnetic heads 33, carriage assembly 14, and voice coil motor (VCM) 24. The spindle motor 18 supports and rotates the magnetic disk 16. The magnetic heads 33 record data on and reproduce data from the magnetic disk 16. The carriage assembly 14 supports the magnetic heads 33 for movement relative to the surfaces of the magnetic disk 16. The VCM 24 pivots and positions the carriage assembly 14. Further, the bottom wall 12*a* carries thereon a ramp loading mechanism 25, latch mechanism 28, and board unit 21. The ramp loading mechanism 25 holds the magnetic heads 33 in a position off the magnetic disk 16 when the magnetic heads 33 are moved to the outermost periphery of the magnetic disk 16. The latch mechanism 28 holds the carriage assembly 14 in a retracted position if the HDD is jolted, for example. Electronic components, such as connectors, are mounted on the board unit 21.

A control circuit board (not shown) is attached to the outer surface of the base 12 by screws. The control circuit board controls the operations of the spindle motor 18, VCM 24, and magnetic heads 33 through the board unit 21.

As shown in FIG. 1, the magnetic disk 16 is coaxially fitted on the hub of the spindle motor 18 and clamped and secured to the hub by a clamp spring 19, which is attached to the upper end of the hub by screws. The magnetic disk 16 is rotatable at a predetermined speed in the direction of arrow A by the spindle motor 18 for use as a drive motor.

The carriage assembly 14 comprises a bearing 26 secured to the bottom wall 12*a* of the base 12 and a plurality of arms 27 extending from the bearing 26. The arms 27 are located parallel to the surfaces of the magnetic disk 16 and at predetermined intervals and extend in the same direction from the bearing 26. The arms 27 may be formed as an E-block integral with a sleeve of the bearing 26.

The carriage assembly 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. Each suspension 30 may be formed integrally with its corresponding arm 27. Each magnetic head 33 is supported on an extended end of its corresponding suspension 30. Each arm 27 and its corresponding suspension 30 constitute a head suspension, which, along with its corresponding magnetic head 33, constitutes a head suspension assembly.

As shown in FIG. 2, each magnetic head 33 comprises a substantially cuboid slider 42 and read/write head section 44 on an outflow end (trailing end) of the slider 42. The magnetic head 33 is secured to a gimbal spring 41 on the distal end portion of the suspension 30. A head load G directed to the surface of the magnetic disk 16 is applied to each magnetic head 33 by the elasticity of the suspension 30. The two arms 27 are arranged parallel to and spaced apart from each other, and the suspensions 30 and magnetic heads 33 mounted on these arms face one another with the magnetic disk 16 between them.

Each magnetic head 33 is electrically connected to the board unit 21 through a relay flexible printed circuit (FPC) board 35 secured on the suspension 30 and arm 27.

If a voice coil of the VCM 24 is energized with the magnetic disk 16 rotating, the carriage assembly 14 pivots, whereupon each magnetic head 33 is moved to and positioned on a desired track of the disk 16. As this is done, the magnetic head 33 is moved radially relative to the magnetic disk 16 between the inner and outer peripheral edges of the magnetic disk, as indicated by two-dot chain lines in FIG. 1. Thus, the magnetic head 33 moves between an inner peripheral position on the inner peripheral end side, intermediate peripheral position in the middle, and outer peripheral position on the outer peripheral end side of the magnetic disk 16.

The following is a detailed description of the configuration of the magnetic disk 16 and each magnetic head 33. FIG. 3 is an enlarged sectional view showing the head section 44 of the magnetic head 33 and the magnetic disk 16.

As shown in FIGS. 1 to 3, the magnetic disk 16 comprises a substrate 101 formed of a nonmagnetic disk with a diameter of, for example, about 2.5 inches (6.25 cm). A perpendicular recording layer 103, crystal orientation layer 102, heat sink layer 104, and protective film 105 are formed on each surface of the substrate 101. The recording layer 103 has a high anisotropy perpendicular to the disk surface. The crystal orientation layer 102 is arranged below the recording layer 103 to improve the orientation of the layer 103. The heat sink layer 104 is arranged below the crystal orientation layer 102 to suppress spreading of a heating region. The protective film 105 is arranged on top of the recording layer 103.

As shown in FIGS. 2 and 3, the magnetic head 33 is formed as a flying head, and comprises the substantially cuboid slider 42 and the head section 44 formed on the outflow or trailing end portion of the slider. The slider 42 is formed of, for example, a sintered body (AlTic) containing alumina and titanium carbide, and the head section 44 is formed by laminating thin films.

The slider 42 has a rectangular medium-facing surface or air-bearing surface (ABS) 43 configured to face a surface of the magnetic disk 16. The slider 42 is caused to fly by an airflow B that is produced between the disk surface and the ABS 43 as the magnetic disk 16 rotates. The direction of the airflow B is coincident with the direction of rotation A of the magnetic disk 16. The slider 42 is arranged on the surface of the magnetic disk 16 in such a manner that the longitudinal direction of the ABS 43 is substantially coincident with the direction of the airflow B.

The slider 42 comprises leading and trailing ends 42*a* and 42*b* on the inflow and outflow sides, respectively, of the airflow B. The ABS 43 of the slider 42 is formed with leading and trailing steps, side steps, negative-pressure cavity, etc., which are not shown.

As shown in FIG. 3, the head section 44 is formed as a dual-element magnetic head, comprising a reproduction head 54 and recording head (magnetic recording head) 58 formed on the trailing end 42*b* of the slider 42 by thin-film processing.

The reproduction head 54 comprises a magnetic film 55 having a magnetoresistive effect and shielding films 56 and 57 disposed on the trailing and leading sides, respectively, of the magnetic film 55 such that they sandwich the magnetic film between them. The respective lower ends of the magnetic film 55 and shield films 56 and 57 are exposed in the ABS 43 of the slider 42.

As shown in FIG. 3, the recording head 58 is located nearer to the trailing end 42*b* of the slider 42 than the reproduction head 54. The recording head 58 comprises a main pole 60 of a soft magnetic material with high permeability and high saturation magnetic flux density, trailing yoke 62 of a soft magnetic material, junction 64, recording coil 66, plasmon generator or near-field transducer 65, and waveguide 68. The main pole 60 produces a recording magnetic field perpendicular to the surface of the magnetic disk 16 (or to the recording layer 103). The trailing yoke 62 is arranged on the trailing side of the main pole 60 and magnetically bonded to the main pole so that it can pass magnetic flux to the main pole. The junction 64 physically bonds an upper part (end portion off the ABS 43) of the trailing yoke 62 to the main pole 60. The recording coil 66 is arranged so that it is wound around a magnetic path including the trailing yoke and main pole to pass magnetic flux to the main pole. The near-field transducer 65 is arranged on the leading side of the main pole 60 and emits near-field light for heating the recording layer 103 of the magnetic disk 16. The waveguide 68 propagates light for the emission of the near-field light to the near-field transducer 65. A distal end surface 60*a* of the main pole 60, the distal end surface of the trailing yoke 62, and a distal end 65*a* of the near-field transducer 65 are exposed in the ABS 43 of the slider 42 and arranged flush with one another.

Current to be supplied to the recording coil 66 is controlled by a control circuit board 25 of the HDD. In writing a signal to the magnetic disk 16, a predetermined current is supplied from a power supply to the recording coil 66 so that magnetic flux is passed to the main pole 60 to produce a magnetic field. Further, a laser beam emitted from a laser diode 70 as a light source is applied to the waveguide 68 and supplied to the near-field transducer 65 through the waveguide 68. In FIG. 3, arrow C indicates the direction of movement of the magnetic head 33 relative to the magnetic disk 16.

FIG. 4 is a schematic plan view of the ABS-side end portion of the recording head taken through the top of the magnetic head. As shown in FIGS. 3 and 4, the main pole 60 comprises a magnetic pole end surface 60*b* facing the near-field transducer 65. The pole end surface 60*b* extends from the ABS 43 toward the inner part of the slider 42, that is, away from the ABS 43. In the present embodiment, the pole end surface 60*b* extends perpendicular to the ABS 43. Further, the near-field transducer 65 comprises the distal end portion 65*a* exposed in the ABS 43. The distal end portion 65*a* serves as a heating spot center S.

The pole end surface 60*b* is asymmetric with respect to a central axis CL that passes through the transverse center of the main pole 60 (in the cross-track direction) and the heating spot center S and extends longitudinally relative to the slider 42 (in the direction of movement of the magnetic head 33 relative to the magnetic disk 16). In the present embodiment, the distal end surface 60*a* is a flat surface inclined at an angle θ to a plane CT that extends in the cross-track direction perpendicular to the central axis CL. Specifically, the pole end surface 60*b* is inclined away from the heating spot center S in a region IN in the inner peripheral direction of the medium, with respect to the central axis CL, and inclined toward the heating spot center S in a region OUT in the outer peripheral direction of the medium. The angle θ is suitably set within a range, $0° < \theta < 90°$, depending on the diameter, peripheral speed, etc., of the magnetic disk 16.

As shown in FIG. 3, the waveguide 68 extends from just above the near-field transducer 65 to the upper end or suspension-side end of the slider 42. The ABS-side end portion (extended end portion) of the waveguide 68 faces the near-field transducer 65 with a gap therebetween. A protective insulating layer 74 is interposed between the waveguide 68 and near-field transducer 65. The nonmagnetic protective insulating layer 74 cover the entire reproduction head 54 and recording head 58 except those parts which are exposed in the ABS 43 of the slider 42. The protective insulating layer 74 defines the external shape of the slider 42.

If the VCM 24 is activated, according to the HDD constructed in this manner, the carriage assembly 14 pivots, whereupon each magnetic head 33 is moved to and positioned on a desired track of the magnetic disk 16. Further, the magnetic head 33 is caused to fly by the airflow B that is produced between the disk surface and the ABS 43 as the disk 16 rotates. When the HDD is operating, the ABS 43 of the slider 42 is opposed to the disk surface with a gap therebetween. In this state, the reproduction head 54 reads recorded data from the magnetic disk 16, while the recording head 58 writes data (signal) to the magnetic disk.

In writing the data, the main pole 60 is excited by the recording coil 66, and the data is recorded with a desired track width in such a manner that a perpendicular recording magnetic field is applied to the recording layer 103 of the magnetic disk 16 just below the main pole 60. Further, a laser beam is introduced from the laser diode 70 to the near-field transducer 65 through the waveguide 68, whereupon near-field light is emitted from the transducer 65. The recording layer 103 of the disk 16 is locally heated by the near-field light emitted from the distal end portion 65*a* of the transducer 65 so that the coercive force of the recording layer portion is reduced. A recording filed from the main pole 60 and a signal is applied or written to this coercive force reduction area. Thus, high-density recording can be performed by writing the signal to the area where the coercive force is sufficiently reduced by locally heating the recording layer portion.

In the recording head 58 according to the present embodiment, the shape of the pole end surface 60*b* of the main pole 60 is made asymmetric with respect to the longitudinal direction (central axis CL) of the slider 42. By doing this, a distance L between the heating spot center S defined by the near-field transducer 65 and a point where the pole end surface 60*b* and central axis CL cross each other is varied according to the skew angle of the magnetic head. For the variation, the distance L is made short on the inner peripheral side and long on the outer peripheral side, based on the intermediate peripheral position of the magnetic disk 16.

While there exists a time T of medium travel between the heating spot center S and the pole end surface that ensures an optimal signal-to-noise (S/N) ratio for a recorded signal, in thermally-assisted recording, this time varies depending on the moving speed (peripheral speed) of the magnetic disk. In the case of a conventional magnetic recording head, therefore, the travel time T is longer on the inner peripheral side and shorter on the outer peripheral side than in the intermediate peripheral position (based on the peripheral speed). According to the present embodiment, in contrast, the distance L and the peripheral speed are shorter and lower, respectively, on the inner peripheral side and longer and higher, respectively, on the outer peripheral side, so that lags in the medium travel time T between the inner, intermediate, and outer peripheries of the magnetic disk are small. Thus, in the case of the magnetic recording head according to the present embodiment, recording can be performed in such a state that the medium travel time T for the optimal S/N ratio is approximated in any radial position of the magnetic disk 16.

Figure 6:
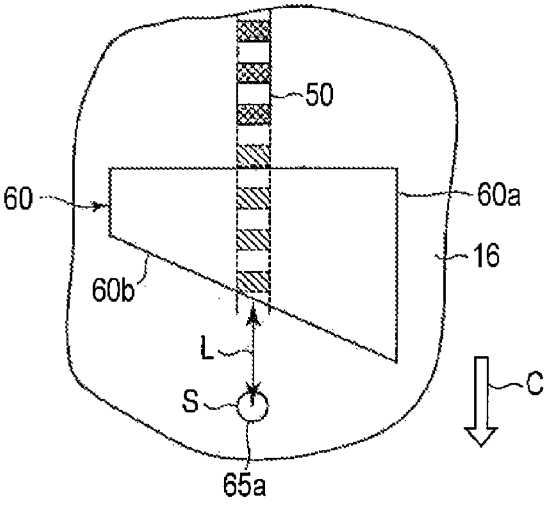
FIG. 6 is a plan view showing positional relationships between a heating spot center, a main pole, and a recording track in the state of FIG. 5.

FIG. 5 shows the positional relationship between the magnetic head 33 and a recording track 50 in the case where the thermally-assisted magnetic recording is performed in the intermediate peripheral position of the magnetic disk 16. FIG. 6 shows the positional relationships between the heating spot center S, main pole 60, and recording track 50 in the state of FIG. 5. In this case, the longitudinal direction of the magnetic head 33 (or the longitudinal direction of the slider 42 along the central axis CL) is coincident with the direction of relative movement C of the magnetic head. Since data is recorded on the recording track 50 in the longitudinal direction of the slider 42, the distance L between the heating spot center S for recording and the pole end surface 60*b* is nothing but a distance longitudinally relative to the slider 42.

Figure 7:
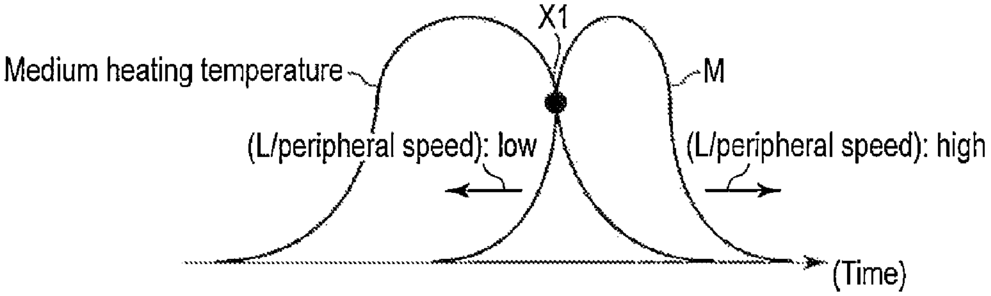
FIG. 7 is a diagram showing influences of heating and a magnetic field from the magnetic head on the magnetic disk at one spot on the disk.

FIG. 7 shows influences of heating and a magnetic field from the magnetic head 33 on the magnetic disk 16 at one spot on the disk, along the time axis. During magnetic recording, as shown in FIG. 7, the recording area of the recording layer 103 of the magnetic disk 16 is previously heated by the near-field light so that its coercive force is reduced. Thereafter, a recording magnetic field M is received from the main pole 60 and the signal is written. As the recording layer 103 of the magnetic disk 16 is cooled after being heated, its coercive force increases. When the recording magnetic field M received from the recording head 58 is exceeded, thermally-assisted magnetic recording in the position concerned is completed. This position is represented by a point of intersection X1 for convenience. The state of FIG. 7 is regarded as a state where an optimal recording signal S/N ratio can be obtained. If the ratio of the distance L to the disk peripheral speed in FIG. 7 is reduced, the recording magnetic field M temporally moves forward. If this distance-to-speed ratio becomes higher, the recording magnetic field M temporally moves backward. As a result, point of intersection X1 inevitably moves or shifts from its optimal position.

The following is a comparative evaluation of magnetic recording in the inner and outer peripheral positions, based on the state of thermally-assisted magnetic recording in the intermediate peripheral position shown in FIGS. 5 to 7 as a reference or optimal state.

FIG. 8 shows the positional relationship between the magnetic head 33 and recording track 50 in the case where the thermally-assisted magnetic recording is performed in the inner peripheral position of the magnetic disk 16. FIG. 9 shows the positional relationships between the heating spot center S, main pole 60, and recording track 50 in the state of FIG. 8. In this case, the longitudinal direction of the magnetic head 33 (or the longitudinal direction of the slider 42 along the central axis CL) crosses the direction of relative movement C of the head in such a manner that the outflow end of the head (on the upper side in FIG. 8) is directed toward the center of the disk (or to the left in FIG. 8).

Since the main pole 60 is inclined toward the inner periphery of the magnetic disk 16 with respect to the recording track 50, the center of the pole end surface 60*b* (point of intersection with the central axis CL) on the recording track 50 moves to the inner peripheral side of the position shown in FIG. 6. The distance L for the magnetic recording is shorter than the distance L in the intermediate peripheral position shown in FIG. 6. At the same time, the peripheral speed of the magnetic disk 16 is lower in the inner peripheral position than in the intermediate peripheral position, so that the ratio of the distance L to the peripheral speed is offset and becomes substantially equal to that in the intermediate peripheral position.

FIG. 10 shows influences of heating and the magnetic field from the magnetic head 33 on the magnetic disk 16 at one spot on the disk in the state shown in FIG. 9. During magnetic recording, as shown in FIG. 10, the recording area of the recording layer 103 of the magnetic disk 16 is previously heated by the near-field light so that its coercive force is reduced. Thereafter, the recording magnetic field M is received from the main pole 60 and the signal is written. As the recording layer 103 of the magnetic disk 16 is cooled after being heated, its coercive force increases. When the recording magnetic field M received from the recording head 58 is exceeded, thermally-assisted magnetic recording in the position concerned is completed. This position is represented by a point of intersection X2 for convenience.

Since the ratio of the distance L to the peripheral speed in the inner peripheral position is substantially equal to that in the intermediate peripheral position, as described above, point of intersection X2 is substantially coincident with point of intersection X1 shown in FIG. 7. Since the distance L and the peripheral speed do not always vary at the same rate, points of intersection X1 and X2 may possibly be different. However, the amount of deviation is considerably smaller than that of the conventional recording head. Thus, the thermally-assisted magnetic recording can also be performed at the optimal recording signal S/N ratio in the inner peripheral position of the magnetic disk 16.

FIG. 11 shows the positional relationship between the magnetic head 33 and recording track 50 in the case where the thermally-assisted magnetic recording is performed in the outer peripheral position of the magnetic disk 16. FIG. 12 shows the positional relationships between the heating spot center S, main pole 60, and recording track 50 in the state of FIG. 11. In this case, the longitudinal direction of the magnetic head 33 (or the longitudinal direction of the slider 42 along the central axis CL) crosses the direction of relative movement C of the head in such a manner that the outflow end of the head (on the upper side in FIG. 12) is directed away from the center of the disk (or to the right in FIG. 8).

Since the main pole 60 is inclined toward the outer periphery of the magnetic disk 16 with respect to the recording track 50, the center of the pole end surface 60*b* (point of intersection with the central axis CL) on the recording track 50 moves to the outer peripheral side of the position shown in FIG. 6. The distance L for the magnetic recording is longer than the distance L in the intermediate peripheral position shown in FIG. 6. At the same time, the peripheral speed of the magnetic disk 16 is higher in the outer peripheral position than in the intermediate peripheral position, so that the ratio of the distance L to the peripheral speed in the outer peripheral position is offset and becomes substantially equal to that in the intermediate peripheral position.

FIG. 13 shows influences of heating and the magnetic field from the magnetic head 33 on the magnetic disk 16 at one spot on the disk in the state shown in FIG. 12. During magnetic recording, as shown in FIG. 13, the recording area of the recording layer 103 of the magnetic disk 16 is previously heated by the near-field light so that its coercive force is reduced. Thereafter, the recording magnetic field M is received from the main pole 60 and the signal is written. As the recording layer 103 of the magnetic disk 16 is cooled after being heated, its coercive force increases. When the recording magnetic field M received from the recording head 58 is exceeded, thermally-assisted magnetic recording in the position concerned is completed. This position is represented by a point of intersection X3 for convenience.

Since the ratio of the distance L to the peripheral speed in the inner peripheral position is substantially equal to that in the intermediate peripheral position, as described above, point of intersection X3 is substantially coincident with point of intersection X1 shown in FIG. 7. Since the distance L and the peripheral speed do not always vary at the same rate, points of intersection X1 and X3 may possibly be different. However, the amount of deviation is considerably smaller than that of the conventional recording head. Thus, the thermally-assisted magnetic recording can also be performed at the optimal recording signal S/N ratio in the outer peripheral position of the magnetic disk 16.

FIG. 14 shows the positional relationships between the main pole of the recording head according to the first embodiment and the heating spot center S in the down-track and cross-track directions. As shown in FIG. 15, the peripheral speed and skew angle of the magnetic head in each radial position are calculated under conditions of the HDD including the rotational frequency of the magnetic disk at 5,400 rpm and skew angles of the magnetic head of +17° (innermost periphery: R=14 mm), 0° (intermediate periphery: R=22 mm), and −17° (outermost periphery: R=33 mm).

Let us assume, as shown in FIG. 14, that the pole end surface 60*b* of the main pole 60 is located in such a position that the distance L in the longitudinal direction of the slider (or the down-track direction) from the heating spot center S is 100 nm. FIG. 16 shows the result of calculation of the time required for travel between the heating spot center S and pole end surface 60*b* in each radial position of the magnetic disk. In the case of the recording head with a conventional structure (comparative example), a deviation D of the time required for travel between the heating spot center S and pole end surface 60*b* in each of the inner, intermediate, and outer peripheral positions is about 6.2 ns. In the case of the recording head with the above-described structure, as shown in FIG. 16, in contrast, the deviation D of the required time is about 2.5 ns, which indicates a substantial reduction.

According to the HDD constructed in this manner, magnetic recording can be performed at such a timing that an optimal signal quality can be obtained in any of the inner, intermediate, and outer peripheries of the medium, without regard to the radial position for the recording. Thus, there can be provided a magnetic recording head with improved recording characteristics with respect to the track direction, in which an optimal recording signal S/N ratio can be obtained in any radial position of the recording medium, and a disk drive with the same.

The following is a description of HDDs and magnetic recording heads according to alternative embodiments. In the description of these alternative embodiments to follow, like reference numbers are used to designate the same parts as those of the first embodiment, and a detailed description thereof is omitted.

Second Embodiment

FIG. 17 shows the positional relationships between a main pole of a recording head of an HDD according to a second embodiment and a heating spot center in the down-track and cross-track directions.

In a recording head 58 of the HDD according to the second embodiment, as shown in FIG. 17, a pole end surface 60*b* of a main pole 60 facing a near-field transducer 65 is asymmetric with respect to a central axis CL that passes through the transverse center of the main pole 60 (in the cross-track direction) and a heating spot center S and extends longitudinally relative to a slider (in the direction of movement of a magnetic head relative to a magnetic disk 16). The pole end surface 60*b* is a flat surface bent in the center and is inclined relative to a plane CT that passes through the point of intersection of the central axis CL and pole end surface 60*b* and extends in the cross-track direction perpendicular to the central axis CL. Specifically, a first region 60(IN) of the pole end surface 60*b* in the inner peripheral direction of the medium with respect to the central axis CL is inclined away from the heating spot center S at an angle θ1, and a second region 60(OUT) in the outer peripheral direction of the medium is inclined toward the heating spot center S at an angle θ2. Angles θ1 and θ2 are suitably set within a range, $0° < \theta 1$ (or $\theta 2) < 90°$, depending on the diameter, peripheral speed, etc., of the magnetic disk. Further, the inclination angles θ1 and θ2 care made different from each other so that angle θ2 is greater than angle θ1 ($\theta 1 < \theta 2$).

Let us assume, as shown in FIG. 17, that the main pole 60 is configured so that a distance L from the heating spot center S to the pole end surface 60*b* in the longitudinal direction of the slider along the central axis CL is 100 nm. FIG. 18 shows the result of calculation of the time required for travel between the heating spot center S and pole end surface 60*b* in each radial position of the magnetic disk. The peripheral speed and skew angle in each radial position is calculated under the same conditions of the HDD as those shown in FIG. 15. As seen from FIG. 18, the magnetic recording head 58 according to the second embodiment, compared with the recording head with the conventional structure, is configured so that a deviation D of the time required for travel in each of the inner, intermediate, and outer peripheral positions is reduced. It can be seen, moreover, that the deviation D of the required time in the case of the magnetic recording head 58 is also smaller than in the case of the magnetic recording head according to the first embodiment (FIG. 16).

In the second embodiment, other configurations of the magnetic head 33 and the HDD are the same as those of the foregoing first embodiment. According to the second embodiment arranged in the above-described manner, there can also be provided a magnetic recording head with improved recording characteristics with respect to the track direction, in which an optimal recording signal S/N ratio can be obtained in any radial position of the recording medium, and a disk drive with the same.

Third Embodiment

FIG. 19 shows the positional relationships between a main pole of a recording head of an HDD according to a third embodiment and a heating spot center in the down-track and cross-track directions.

In a recording head 58 of the HDD according to the third embodiment, as shown in FIG. 19, a pole end surface 60*b* of a main pole 60 facing a near-field transducer 65 is asymmetric with respect to a central axis CL that passes through the transverse center of the main pole 60 (in the cross-track direction) and a heating spot center S and extends longitudinally relative to a slider (in the direction of movement of a magnetic head relative to a magnetic disk 16). The pole end surface 60*b* is a curved surface concave on the side of the near-field transducer 65 and is inclined relative to a plane CT that passes through the point of intersection of the central axis CL and pole end surface 60*b* and extends in the cross-track direction perpendicular to the central axis CL.

Specifically, a first region 60(IN) of the pole end surface 60*b* on the inner peripheral side of the medium with respect to the central axis CL is inclined away from the heating spot center S at an angle $\theta 1$, and a second region 60(OUT) on the outer peripheral side of the medium is inclined toward the heating spot center S at an angle $\theta 2$. Angles $\theta 1$ and $\theta 2$ are suitably set within a range, $0° < \theta 1$ (or $\theta 2$)$< 90°$, depending on the diameter, peripheral speed, etc., of the magnetic disk. Further, the inclination angles $\theta 1$ and $\theta 2$ are made different from each other so that angle $\theta 2$ is greater than angle $\theta 1$ ($\theta 1 < \theta 2$).

Since the pole end surface 60*b* is a curved surface, moreover, the angle of inclination of the first region 60(IN) on the inner peripheral side of the medium to the plane CT decreases with distance from the central axis CL, while that of the second region 60(OUT) on the outer peripheral side of the medium increases with distance from the central axis CL.

Let us assume, as shown in FIG. 19, that the main pole 60 is configured so that a distance L from the heating spot center S to the pole end surface 60*b* in the longitudinal direction of the slider along the central axis CL is 100 nm. FIG. 20 shows the result of calculation of the time required for travel between the heating spot center S and pole end surface 60*b* in each radial position of the magnetic disk. The peripheral speed and skew angle in each radial position are calculated under the same conditions of the HDD as those shown in FIG. 15. As seen from FIG. 20, the magnetic recording head 58 according to the third embodiment, compared with the recording head with the conventional structure, is configured so that a deviation D of the time required for travel in each of the inner, intermediate, and outer peripheral positions is further reduced. It can be seen, moreover, that the deviation D of the required time in the case of the magnetic recording head 58 is also smaller than in the cases of the magnetic recording heads according to the first and second embodiments (FIGS. 16 and 18).

In the third embodiment, other configurations of the magnetic head 33 and the HDD are the same as those of the foregoing first embodiment. According to the third embodiment arranged in the above-described manner, there can also be provided a magnetic recording head with improved recording characteristics with respect to the track direction, in which an optimal recording signal S/N ratio can be obtained in any radial position of the recording medium, and a disk drive with the same.

FIG. 21 comparatively shows estimates of the recording signal S/N ratio for each radial position of the medium for the recording head with the conventional structure (comparative example) and the recording heads according to the first to third embodiments. Any of the recording heads is assumed to be adjusted so that the optimal S/N ratio can be obtained in a position of the magnetic disk corresponding to R=21.6 mm. In the recording head of the comparative example, the S/N ratio is reduced (so that the error rate is reduced) as the inner and outer peripheral sides of the magnetic disk are approached. In any of the recording heads of the embodiments, however, the reduction ratio of the S/N ratio is lower than in the comparative example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes, sizes, etc., of the constituent elements of the head section may be changed if necessary. In the magnetic disk drive, moreover, the numbers of magnetic disks and heads can be increased as required, and the disk size can be variously selected. The pole end surface of the main pole is not limited to the flat or curved surface and may alternatively be an end surface that is bent in a plurality of steps.

What is claimed is:

1. A magnetic recording head comprising:

a medium-facing surface configured to face a recording layer of a disk recording medium;

a near-field transducer partially exposed in the medium-facing surface and configured to emit a near-field light which heats the recording medium; and a magnetic pole comprising a distal end surface exposed in the medium-facing surface and a pole end surface facing the near-field transducer and configured to apply a recording magnetic field to the recording layer of the recording medium, the pole end surface in the medium-facing surface being asymmetric with respect to a central axis passing through a center of the near-field transducer and extending in a longitudinal direction of the medium-facing surface.

2. The magnetic recording head of claim 1, wherein the pole end surface extends at an angle to a plane perpendicular to the longitudinal direction of the medium-facing surface.

3. The magnetic recording head of claim 2, wherein the pole end surface comprises a first region located on an inner peripheral side of the recording medium with respect to the central axis and a second region located on an outer peripheral side of the recording medium with respect to the central axis, the first region being inclined away from the center of the near-field transducer, the second region being inclined toward the center of the near-field transducer.

4. The magnetic recording head of claim 3, wherein the respective angles of inclination of the first and second regions to the perpendicular plane are different.

5. The magnetic recording head of claim 4, wherein the angle of inclination of the first region to the perpendicular plane is smaller than that of the second region.

6. The magnetic recording head of claim 4, wherein the angle of inclination of the first region to the perpendicular plane decreases with distance from the central axis, and that of the second region increases with distance of the central axis.

7. The magnetic recording head of claim 1, wherein the pole end surface is a flat surface.

8. The magnetic recording head of claim 1, wherein the pole end surface is a curved surface.

9. A disk drive comprising:

a disk recording medium comprising a recording layer;

a drive unit configured to support and rotate the recording medium;

a magnetic recording head which processes data on the recording layer of the recording medium; and a carriage assembly configured to support the magnetic recording head for movement radially relative to the disk recording medium, wherein the magnetic recording head comprises:

a medium-facing surface configured in layer of a disk recording medium;

a near-field transducer partially exposed in the medium-facing surface and configured to emit a near-field light which heats the recording medium; and a magnetic pole comprising a distal end surface exposed in the medium-facing surface and a pole end surface facing the near-field transducer and configured to apply a recording magnetic field to the recording layer of the recording medium, the pole end surface in the medium-facing surface being asymmetric with respect to a central axis passing through a center of the near-field transducer and extending in a longitudinal direction of the medium-facing surface.

10. The disk drive of claim 9, wherein the pole end surface extends at an angle to a plane perpendicular to the longitudinal direction of the medium-facing surface.

11. The disk drive of claim 10, wherein the pole end surface comprises a first region located on an inner peripheral side of the recording medium with respect to the central axis and a second region located on an outer peripheral side of the recording medium with respect to the central axis, the first region being inclined away from the center of the near-field transducer, the second region being inclined toward the center of the near-field transducer.

12. The disk drive of claim 11, wherein the respective angles of inclination of the first and second regions to the perpendicular plane are different.

13. The disk drive of claim 12, wherein the angle of inclination of the first region to the perpendicular plane is smaller than that of the second region.

14. The disk drive of claim 12, wherein the angle of inclination of the first region to the perpendicular plane decreases with distance from the central axis, and that of the second region increases with distance of the central axis.

15. The disk drive of claim 9, wherein the pole end surface is a flat surface.

16. The disk drive of claim 9, wherein the pole end surface is a curved surface.

* * * * *